(12) United States Patent
Hübner

(10) Patent No.: US 6,196,132 B1
(45) Date of Patent: Mar. 6, 2001

(54) BELLOWS OF A CONNECTING CORRIDOR BETWEEN TWO HINGE-LINKED VEHICLES OR VEHICLE PARTS

(75) Inventor: Reinhard Hübner, Kassel (DE)

(73) Assignee: Hubner Gummi und Kunststoff GmbH, Kassel (DE)

( * ) Notice: Subject to any disclaimer, the term of this patent is extended or adjusted under 35 U.S.C. 154(b) by 0 days.

(21) Appl. No.: 09/305,711

(22) Filed: May 5, 1999

(30) Foreign Application Priority Data

May 12, 1998 (DE) .............................................. 198 21 083

(51) Int. Cl.[7] ........................................................ B60D 5/00
(52) U.S. Cl. ............................... 105/18; 105/3; 105/8.1; 105/15; 280/403
(58) Field of Search .................................. 105/3, 4.1, 8.1, 105/15, 18; 280/403

(56) References Cited

U.S. PATENT DOCUMENTS

| 544,203 | * | 11/1992 | Hubner | .................................. | 105/18 |
| 1,063,607 | * | 6/1913 | Schroyer | ................................. | 105/18 |
| 4,127,535 | * | 2/1993 | Schroyer | ................................. | 105/18 |
| 4,138,922 | * | 6/1993 | Walter . | | |

FOREIGN PATENT DOCUMENTS

| 1 057 639 | | 5/1959 | (DE) . |
| GM 1964739 | | 7/1967 | (DE) . |
| 124 57 634 C2 | | 2/1982 | (DE) . |
| 0 544 203 A1 | | 6/1992 | (DE) . |
| 41 27 535 A1 | | 2/1993 | (DE) . |
| 41 38 922 A1 | | 6/1993 | (DE) . |
| 4127535A1 | * | 2/1993 | (GB) .............................. B06D/5/00 |

\* cited by examiner

Primary Examiner—S. Joseph Morano
Assistant Examiner—Frantz F. Jules
(74) Attorney, Agent, or Firm—Thomas R. Vigil

(57) ABSTRACT

Bellows of a connecting corridor between two hinge-linked vehicles or vehicle parts, whereas the bellows is provided with several bellows elements connected together, whereas each bellows element is showing two opposite legs in the initial state of the bellows, whereas, for additional thermal insulation and silencing, each of the two opposite legs (4, 5) of a bellows element are provided on their inner side with at least one strap-joint (10, 20) provided with a coated tissue, whereas the two strap-joints (10, 20) are overlapping.

17 Claims, 1 Drawing Sheet

BELLOWS OF A CONNECTING CORRIDOR BETWEEN TWO HINGE-LINKED VEHICLES OR VEHICLE PARTS

BACKGROUND OF THE INVENTION

1. Field of the Invention.

The present invention relates to a bellows of a connecting corridor between two hinge-linked vehicles or vehicle parts, whereas the bellows is provided with several bellows elements connected together, whereas each bellows element is showing two opposite legs in the initial state of the bellows.

2. Description of the Prior Art.

A bellows of the type mentioned above is component part of the connecting corridor between two hinge-linked vehicles or vehicle parts, for example of an articulated bus, whereas the connecting corridor does not only comprise the bellows but also an intercommunicating gangway, having for example the aspect of an articulated gangway. Depending on the requirements, the bellows may be designed as an expansion bellows or as a concertina bellows. Such a bellows consists in individual folds or bends standing in interconnection with each other and having the structure of an accordion. Thanks to this structure, they are able to yield to all occurring travelling motions of the vehicles, and more particularly in curves and to swaying and nodding movements.

DE-A1 4127 535 discloses an expansion bellows having between its individual folds elastic distance pieces whose function it is to bring the bellows back into its initial position after a curve.

DE-A1 4138 922 describes the bellows of a connection cover that is characterized by additional stiffening means in order to invest the bellows altogether with a higher stability.

DE-GM 1964739 describes a fire-resisting bellows, whereas the bellows is provided with a coating made of polychloroprene.

DE-A 1057 639 discloses a multi-layer wall of a connecting corridor that improves the thermal insulation and the silencing.

DE-C2 2457 634 discloses a cover for a connecting corridor made of individual swellings which have to constitute, on the outer side of the vehicle, an essentially smooth surface. The surface of the individual swellings may hereby be divided on the outer side, in order to facilitate the deformation of the swellings during corresponding travelling motions of the vehicles. The function of the swellings is to improve thermal insulation and silencing as compared with a usual bellows. The disadvantage is that, due to the division of the swellings in the outer area, dirt may accumulate very fast in the swellings. This accelerates the destruction of the bellows.

Another known procedure is to provide particularly fast trains with a so-called double concertina bellows (EPA1 544 203), in order to screen the connecting corridor against noises coming from outside. Such a double concertina bellows essentially consists in two bellows radially arranged one behind the other. Such a double concertina bellows requires quite a lot of space, whereas so much space is not very often at disposal, all the more if the clear corridor between two vehicles that is covered by the bellows has to be as big as possible.

SUMMARY OF THE INVENTION

The object of the present invention is therefore to provide a bellows of the type mentioned above that presents a quality in thermal insulation as well as in silencing equalling that of a double concertina bellows, but that requires less space.

The solution of the present invention is to provide, for additional thermal insulation and silencing, each of the two opposite legs of a bellows element on their inner side with at least one strap-joint provided with a coated tissue, whereas the two strap-joints are overlapping. Thanks to one or two such strap-joints that are fitting snugly to the inner wall of the bellows element when the bellows is in its initial state or that are minimally spaced from the inner wall of the bellows element, silencing is achieved together with simultaneously increased thermal insulation values. Such a strap-joint is planiform. It extends at least over the height of the bellows, that is over its side wall area, but preferably over the complete inner circumference, that is over the side wall area and over the ceiling area. The initial state of the bellows describes the position the bellows is occupying when resting, that is when the bellows is neither expanded nor contracted. The length of the strap-joint is calculated so that, even if the bellows is expanded, that is when the legs of the bellows element are no more facing each other, the strap-joint is still covering in width the major part of the bellows element. The strap-joints are hereby advantageously arranged in the area of the bow of the bellows element in order not to hinder the deformation capacity of the bellows, particularly when driving curves.

According to a particularly advantageous feature of the invention, the strap-joint is provided with a coating having preferably the design of an insulating layer, whereas said insulating layer may be sewed or glued on. Thanks to its relatively high volume weight, such a coating, preferably made of silicone foam, not only ensures a good silencing but also a very good thermal insulation.

In order to prevent the coating from eroding because of the relative motion of the strap-joints relative to each other, the strap-joint is provided on its free end with a hood-like sleeve that is seizing the strap-joint as well as the insulating layer.

A strap-joint that has a stability such that it is able to carry the insulating layer is for example made of a coated, particularly rubber-impregnated tissue, the same of which the bellows too is made.

According to another feature of the invention, the bellows element is provided with a cover that may at least protect the strap-joint over the width of the insulating layer. The function of such a cover is on one hand to hide the strap-joints, on the other to protect them, and more particularly the insulating layer, from damage due to external influences. The cover advantageously has an arch building a hollow space aligned opposite the bow of the bellows element, whereas this hollow space is achieving, together with the material of the cover, an additional highly effective silencing and thermal insulation.

According to another characteristic of the invention, the cover may be arranged on the strap-joints in such a way that the two strap-joints may be arranged on the inner wall of a bellows element together with the cover, actually constituting one unit. The individual bellows elements may be connected together by riveting, gluing, bonding or similar measures, the preferred way of connecting them together though consisting in frame beads of aluminium for example. Hereby, the legs of two bellows elements and one of the strap-joints may for example be seized by the frame bead thanks to the fact that the strap-joint arranged on one of the legs of the bellows element is projecting up to the open end of the bellows element. This presents the advantage that the strap-joints only have to be arranged on the one leg of the bellows element by separate measures, for example by sewing, whereas the strap-joint located on the other leg is seized by a frame bead or by another similar fastening, being thus fastened in the course of the connecting process of two bellows elements. The connection of the two strap-joints by the cover represents an inexpensive but stable way of connecting the strap-joint to the bellows element that is easy to build and to operate.

It has to be noted that, when the train is in its normal state, that is in the position in which it drives with high velocity and in which correspondingly strong noises are occurring, the arrangement of the strap-joints and of the cover are ensuring the best possible silencing with little need of material.

The invention is explained in more details according to the drawing.

DESCRIPTION OF THE PREFERRED EMBODIMENT(S)

Figure 1:
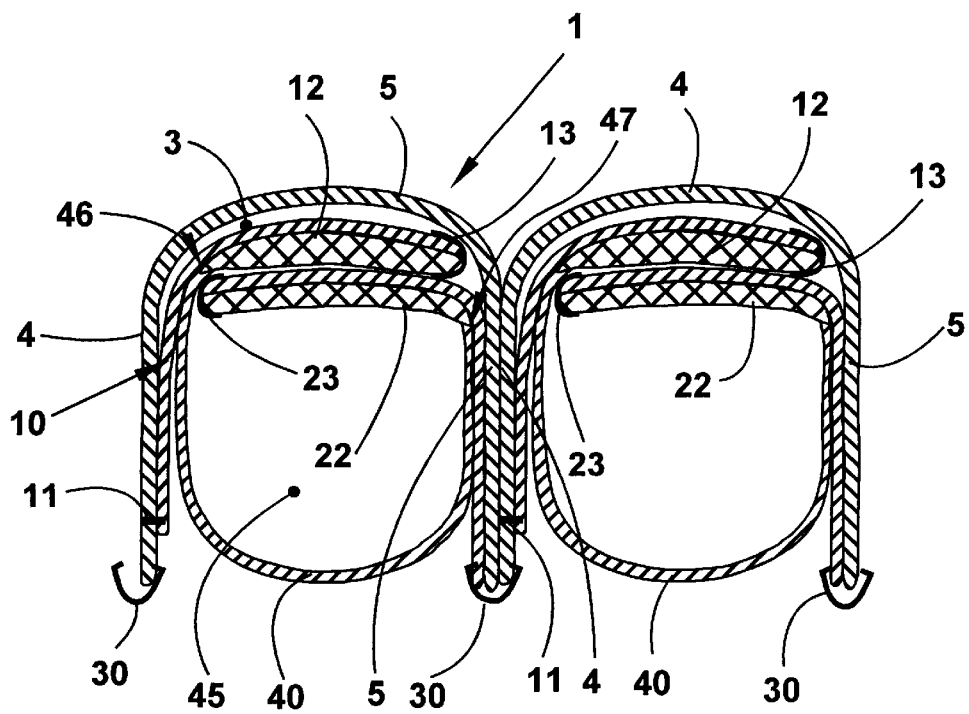
FIG. 1 shows a section of two bellows elements of a concertina bellows.
Figure 2:
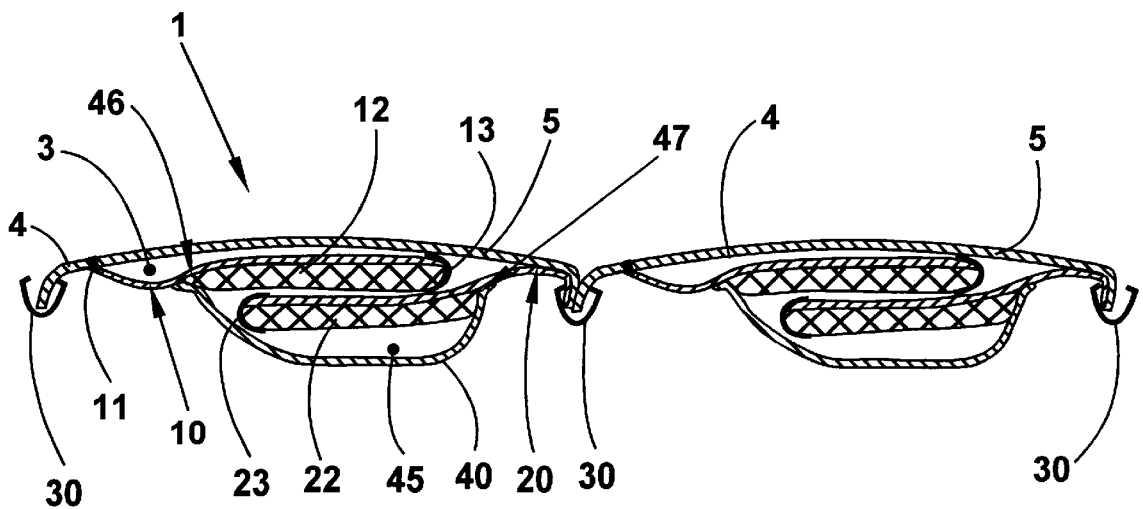
FIG. 2 shows the expanded state of the two bellows elements according to FIG. 1.

According to FIG. 1, the bend-shaped bellows elements are designated by numeral 1; the two strap-joints 10, 20 are surrounded by the bend-shaped bellows element 1, that is that they are arranged on the inner side of the bellows element on the legs 4, 5. The strap-joint 10 is hereby sewn on the bellows element 1 at point 11 so that it is spaced from the end of the bellows element 1. The strap-joint 10 is consisting in a rubbered tissue and is provided, on its side facing the inner side of the bellows, with an insulating layer 12, made for example of a silicone foam. In order to prevent the insulating layer 12 to erode on the inner wall of the bellows element 1, a hood-like sleeve 13 has been provided that encompasses the ends of the strap-joint 10 as well as those of the insulating layer 12. The sleeve 13 is fastened on strap-joint 10 or on insulating layer 12 by sewing or gluing.

The strap-joint 20 is projecting up to the end of the bellows element 1 and may thus be seized by the frame bead 30 (outlined in the figures). On its inner side, it is provided with an insulating layer 22 made of silicone foam too. The end of the insulating layer as well as of the strap-joint is also seized by a sleeve 23.

The two strap-joints 10 and 20 are connected by the cover designated as a whole with numeral 40, whereas the connection is thus that the cover is arched inwards in order to constitute a hollow space 45 to the strap-joints on one hand and in order to offer enough length when the bellows element is expanding on the other. The cover 40 is fastened by sewing (arrow 46 and arrow 47) onto the strap-joints 10, 20 just underneath the insulating layers 12 and 22.

As may be seen in FIG. 1, there is a spacing forming a hollow space 3 between the inner wall of bellows element 1 and strap-joint 10 in the initial state of the bellows or of the individual bellows elements, that is in the state in which the bellows is neither contracted nor expanded. Since the strap-joints 10 and 20 are not directly adjacent but are spaced at certain places, hollow spaces are taking shape here too. These hollow spaces are increasing the insulating effect with regard to noises as well as with regard to temperature just as it is the case with hollow spaces 3 and 45.

I claim:

1. Bellows for a connecting corridor between two hinge-linked vehicles or vehicle parts, said bellows being provided with at least two bellows elements connected together and each bellows element having two opposite legs when the bellows is in an at rest condition, characterized in that, for additional thermal insulation and silencing, each of the two opposite legs (4,5) of each bellows element is provided on an inner side of each leg with at least one strap-joint (10,20) made of a flexible synthetic material, and with the at least two strap-joints (10,20) overlapping each other.

2. Device according to claim 1, characterized in that at least one of the at least two strap-joints (10,20) is provided with an insulating layer (12,22).

3. Strap-joint according to claim 1, characterized in that at least one of the at least two strap-joints (10,20) is provided on one side with an insulating layer and on its free end with a hook-like sleeve (13,23) which engages with and is fixed to the strap-joint (10,20) as well as to the insulating layer (12,22).

4. Device according to claim 1, characterized in that at least one of the at least two strap-joints (10,20) is arranged, together with an insulating layer, in the area of an arch of each bellows element, enabling thus the bellows elements to contract slightly in a curve.

5. Bellows according to claim 1, characterized in that at least one of the at least two strap-joints (10,20) is provided on one side with an insulating layer and that one side of each bellows element (1) is provided with a cover (40) that protects at least a part of at least one of the at least two strap-joints (10,20) over the width of the insulating layer (12,22).

6. Bellows according to claim 5, characterized in that the cover (40) has an arch building or defining a hollow space (45) aligned opposite a bow of at least one of the at least two bellows elements (1).

7. Bellows according to claim 5, characterized in that the cover (40) may be arranged on the strap-joints (10, 20).

8. Bellows according to claim 1, characterized in that the bellows elements (1) may be connected to each other by means of frame beads (30).

9. Bellows according to claim 1, characterized in that the strap-joints (10,20) of the legs (4,5) of a bellows element (1) are fixed together by a frame bead (30).

10. Bellows according to claim 1, characterized in that the bellows (1) is designed as a concertina bellows or as an expansion bellows.

11. Bellows according to claim 1, characterized in that the strap-joint (10, 20) is planiform.

12. Bellows according to claim 1, characterized in that each strap-joint (10,20) covers at least the height of the bellows element between the legs (4, 5).

13. Bellows according to claim 1, characterized in that each strap-joint (10,20) covers substantially the entire inner side of each bellows element.

14. Bellows for a connecting corridor between two hinge-linked vehicles, or vehicle parts, said bellows being provided with several bellows elements connected together and each bellows element having two opposite legs when the bellows is in an at rest condition, characterized in that, for additional thermal insulation and silencing, each of the two opposite legs (4,5) of each bellows element is provided on an inner side of each leg with at least one strap-joint (10,20) made of a flexible synthetic material, with the two strap-joints (10,20) overlapping each other and with each strap joint (10, 20) having on one side thereof an insulating layer (12,22).

15. Bellows for a connecting corridor between two hinge-linked vehicles or vehicle parts, said bellows being provided with several bellows elements connected together and each bellows element having two opposite legs when the bellows is in an at rest condition, characterized in that, for additional thermal insulation and silencing, each of the two opposite legs (4,5) of each bellows element is provided on an inner side of each leg with at least one strap-joint (10,20) made of a flexible synthetic material, with the two strap-joints (10,20) overlapping each other and with at least one of said strap-joints being provided on its free end with a hook-like sleeve (13,23) that engages with and is fixed to at least one of said strap-joints (10,20) as well as to an insulating layer (12,22) on one side of said at least one strap-joint (10, 20).

16. Bellows for a connecting corridor between two hinge-linked vehicles or vehicle parts, said bellows being provided with several bellows elements connected together and each bellows element having two opposite legs when the bellows is in an at rest condition, characterized in that, for additional thermal insulation and silencing, each of the two opposite legs (4,5) of each bellows element is provided on an inner side of each leg with at least one strap-joint (10,20) made of a flexible synthetic material, with the two strap-joints (10,20) overlapping each other and at least one of the at least two strap joints (10,20) being arranged, together with an insulating layer on one side of the strap joint, in the area of an arch of each bellows element, enabling the bellows elements to contract slightly in a curve.

17. Bellows for a connecting corridor between two hinge-linked vehicles or vehicle parts, said bellows being provided with several bellows elements connected together and each bellows element having two opposite legs when the bellows is in an at rest condition, characterized in that, for additional thermal insulation and silencing, each of the two opposite legs (4,5) of each bellows element are provided on an inner side of each leg with at least one strap-joint (10,20) made of a flexible synthetic material, and with the two strap-joints (10,20) overlapping each other and the bellows element (1) being provided with a cover (40) which protects at least a portion of one of said strap-joints (10,20) over the width of an insulating layer (12,22) fixed to one side of at least one of the strap joints (10, 20).

\* \* \* \* \*